(12) United States Patent
Sundaresan et al.

(10) Patent No.: US 8,533,648 B2
(45) Date of Patent: Sep. 10, 2013

(54) AUTOMATIC CLOCK-GATING PROPAGATION TECHNIQUE

(75) Inventors: Krishnan Sundaresan, Sunnyvale, CA (US); Aravind Oommen, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 555 days.

(21) Appl. No.: 12/779,891

(22) Filed: May 13, 2010

(65) Prior Publication Data
US 2011/0283125 A1    Nov. 17, 2011

(51) Int. Cl.
*G06F 17/50* (2006.01)
(52) U.S. Cl.
USPC ............................................. 716/113; 716/126
(58) Field of Classification Search
USPC .................................................. 716/113, 126
See application file for complete search history.

(56) References Cited

U.S. PATENT DOCUMENTS 7,928,770 B1 * 4/2011 Bellis et al. ...................... 326/96
7,930,673 B2 * 4/2011 Jiang et al. ...................... 716/132

* cited by examiner

*Primary Examiner* — Thuan Do
(74) *Attorney, Agent, or Firm* — Park, Vaughan, Fleming & Dowler, LLP (57) ABSTRACT

Embodiments of the present invention provide a method and system for clock-gating a circuit. During operation, the system receives a description of a circuit that includes clocked memory elements, some of which are clock-gated. Next, the system identifies a sender memory element by identifying a sender path from an output of the sender memory element to a data input for a seed memory element. Then, the system identifies an enable-generating memory element by identifying an enable-signal path from an output of the enable-generating memory element to an enable signal which is used to gate a clock signal input for the seed memory element. Next, the system provides clock-gating for the sender memory element by generating an enable signal using a data input for the enable-generating memory element. Finally, the system gates a clock signal for the sender memory element using this generated enable signal.

20 Claims, 4 Drawing Sheets

AUTOMATIC CLOCK-GATING PROPAGATION TECHNIQUE

RELATED APPLICATIONS

This application is related to U.S. patent application Ser. No. 12,486,171, entitled "Automatic Clock-Gating Insertion and Propagation Technique," filed on 17 Jun. 2009 by the same inventors as the instant application. The aforementioned related application is incorporated hereby by reference.

BACKGROUND

1. Field of the Invention

Embodiments of the present invention facilitate reducing power consumption in integrated circuits. More specifically, embodiments of the present invention facilitate automatically generating circuitry to provide clock-gating for clocked memory elements in an integrated circuit, wherein the clock-gating circuitry reduces switching and thereby saves power in the integrated circuitry.

2. Related Art

Advances in semiconductor manufacturing technologies have led to significant increases in microprocessor performance. Unfortunately, as microprocessor clock speeds continue to increase, there has been a corresponding increase in the amount of power consumed by the microprocessor. This increase in power consumption increases the amount of heat produced by the microprocessor. As a consequence, energy efficiency is becoming an increasingly important consideration in the design of high-end microprocessor systems.

Dynamic or "switching" power is one type of power which is consumed when circuits switch state in a digital system. This switching power can account for as much as 30% of total power consumption in an integrated circuit. To reduce switching power, some microprocessor designers have implemented "clock-gating" techniques in microprocessor systems. Clock-gating is implemented by adding logic to selectively disable (i.e., turn off) clock signals for some sequential memory elements. During clock-gating, circuitry can be added to disable a clock for a sequential element when the element does not change state. Because sequential elements retain their output values when the clock is not switching, the clock can be disabled without affecting the operation of the circuit.

Clock-gating can significantly reduce switching power in a microprocessor. This reduction in switching power can cause a corresponding reduction in the temperature of the microprocessor. Moreover, because sub-threshold leakage currents can vary exponentially with temperature, clock-gating can lead to a significant reduction in leakage currents, which can, in turn, reduce leakage power.

Clock-gating can be implemented by manually identifying clock-gating opportunities. However, this manual process is tedious and time-consuming, which can limit the manual approach to only a small subset of the sequential elements in the microprocessor circuit. In practice, it is desirable to implement clock-gating with automated tools that can identify clock-gating opportunities and can insert clock-gating logic.

Unfortunately, automated tools fail to identify some clock-gating opportunities. For example, some automated tools operate on a high-level model for the microprocessor (e.g., RTL model) and can fail to identify clock-gating opportunities in the final gate-level netlist. Also, because mapping and logic optimization is performed before clock-gate insertion, automated tools can overlook clock-gating opportunities when enable conditions for some sequential elements change (e.g., as a result of buffering or other optimizations).

Hence, what is a needed is a technique for automatically inserting clock-gating logic into a circuit without the above-described problems.

SUMMARY

Embodiments of the present invention provide a method and system for providing clock-gating for a circuit. During operation, the system receives a description of the circuit, wherein the circuit includes a plurality of clock-gated memory elements and a plurality of clocked memory elements. Next, the system identifies a sender memory element in the plurality of clocked memory elements by identifying a sender path from an output of the sender memory element to a data input for a seed memory element. The sender path does not pass through other clocked memory elements in the circuit. Then, the system identifies an enable-generating memory element in the plurality of clocked memory elements by identifying an enable-signal path from an output of the enable-generating memory element to an enable signal which is used to gate a clock signal input for the seed memory element. Next, the system provides clock-gating for the identified sender memory element by generating an enable signal for the sender memory element using a data input for the enable-generating memory element. Then, the system gates a clock signal for the sender memory element using the enable signal for the sender memory element.

In some embodiments of the present invention, generating the enable signal for the sender memory element involves generating an enable signal which is used to gate the clock signal input for the seed memory element in a pipeline stage for the circuit that is earlier than a pipeline stage for the seed memory element.

In some embodiments of the present invention, the enable-generating path passes through intervening combinational logic in the circuit, and generating the enable signal for the sender memory element involves replicating some or all of the intervening combinational logic in a pipeline stage for the circuit that is earlier than a pipeline stage for the seed memory element.

In some embodiments of the present invention, the enable-generating path does not pass through other clocked memory elements in the circuit.

Some embodiments of the present invention identify a second sender memory element in the plurality of clocked memory elements by identifying a second sender path from an output of the second sender memory element to a data input for a second seed memory element. The second sender path does not pass through other clocked memory elements in the circuit. Next, these embodiments identify a second enable-generating memory element in the plurality of clocked memory elements by identifying a second enable-signal path from an output of the second enable-generating memory element to an enable signal which is used to gate a clock signal input for the second seed memory element. Then, these embodiments gate a clock signal for the second sender memory element using the enable signal for the sender memory element. In these embodiments, generating the enable signal for the sender memory element involves functionally combining the data input for the enable-generating memory element with a data input for the second enable-generating memory element.

In some embodiments of the present invention, the enable signal for the sender memory element is asserted when at least one of the enable signal which is used to gate a clock signal input for the seed memory element and the enable signal which is used to gate the clock signal input for the second seed memory element is asserted.

In some embodiments of the present invention, the seed memory element and the second seed memory element are downstream clock-gated memory elements.

In some embodiments of the present invention, the description of the circuit includes at least one of: a Register Transfer Language (RTL) representation, a gate-level representation, and a mixed representation.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Terminology

Throughout this description, the terms "circuit" and "design" are used interchangeably to refer to any representation of a circuit. For example, a circuit/design can be a description of a circuit at a high level of abstraction, such as a circuit model in a Hardware Descriptive Language (HDL), e.g. a Register Transfer Language (RTL) description. A circuit and/or design can include a gate-level netlist and/or transistor level netlist.

Throughout this description, the term "clocked memory element" refers to any sequential element, i.e., a circuit that can retain a logic value. For example, a clocked memory element can be a flip-flop, a latch, a register, or a memory cell.

Throughout this description the term "combinational logic cloud" is used to describe combinational logic. In general, a combinational logic cloud can include a set of logic elements that contain combinational logic, but do not include sequential (e.g., memory) elements.

Throughout this description, the term "gated clock domain" refers to a set of clock-gated memory elements that are commonly gated, i.e., that are clock-gated using a common enable signal. In other words, these clocked memory elements can be clocked with a common clock. Note that the common enable signal and/or common clock can be any signal that is logically equivalent to its "seed" signal, wherein the seed signal is the signal that is used to generate the common enable signal and/or the common clock. For example, some clocked memory elements in a gated clock domain can be clocked using a seed signal, and other clocked memory elements in the same gated clock domain can be clocked using the seed signal after it passes through a set of buffers.

Computer System

Figure 1:
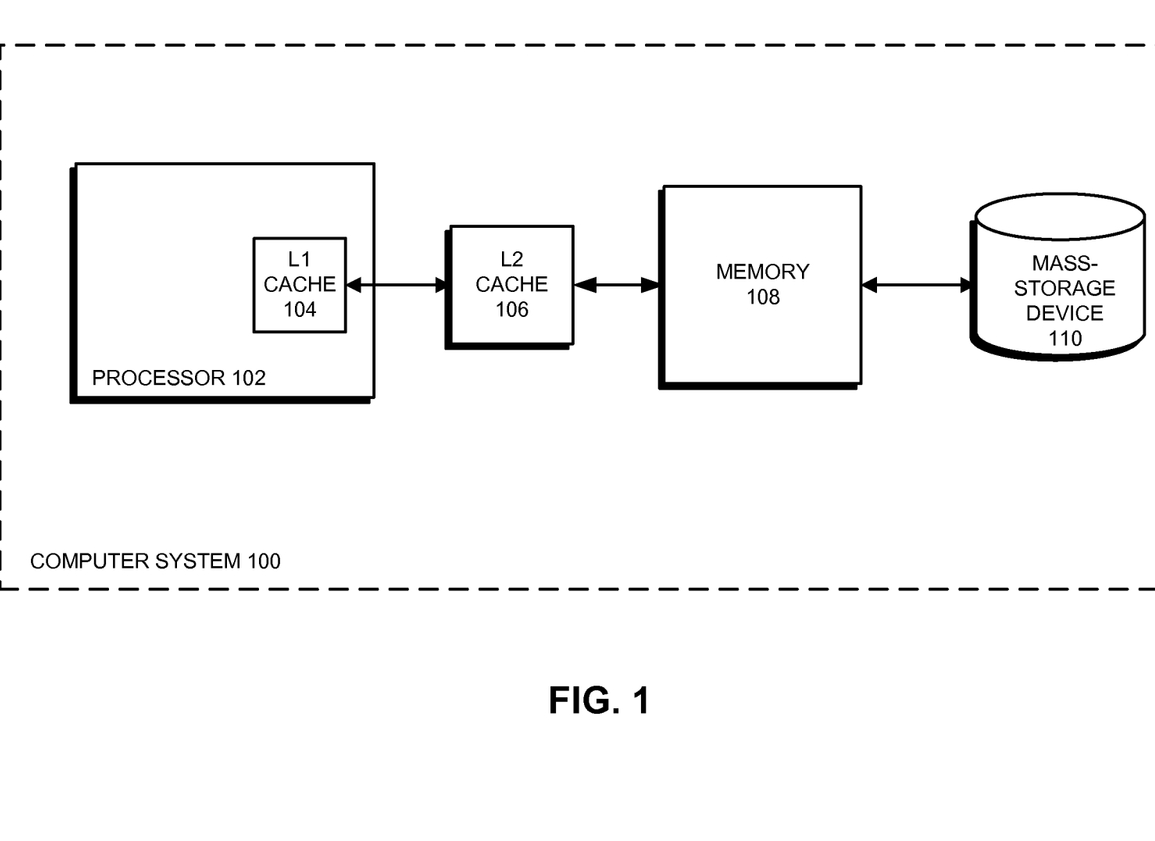
FIG. 1 presents a block diagram of a computer system in accordance with embodiments of the present invention.

FIG. 1 presents a block diagram of a computer system 100 in accordance with embodiments of the present invention. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments of the present invention, L2 cache 106, memory 108, and mass-storage device 110 are shared between one or more processors in computer system 100. Such memory structures are well-known in the art and are therefore not described in more detail.

Computer system 100 can be incorporated into many different types of electronic devices. For example, computer system 100 can be part of a desktop computer, a laptop computer, a server, an appliance, a piece of testing equipment, a network appliance, or another electronic device.

Although we use specific components to describe computer system 100, in alternative embodiments different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and/or mass-storage device 110.

Clock-Gating Propagation

Embodiments of the present invention provide clock-gating for a circuit that includes upstream clocked memory elements ("sender memory elements") and downstream clock-gated memory elements ("seed memory elements"). These embodiments can propagate clock-gating from one or more seed memory elements to one or more sender memory elements. More specifically, these embodiments can recognize when the input of a seed memory element is coupled to outputs of one or more sender memory elements, and can cause the sender memory elements to be clock-gated. Note that gating the clock signal to the sender memory elements can reduce switching power for the circuit. For example, when the clock signal to seed memory elements is off, the clock signal to some sender memory elements can also be turned off.

Embodiments of the present invention can identify one or more sender memory elements that are coupled to seed memory elements. Identifying a sender memory element can involve identifying a path ("sender path") from an output of the sender memory element to a data input for a seed memory element. This path can be identified by traversing the circuit upstream, e.g., from the data input of the seed memory element to the output of the sender memory element. In some embodiments of the present invention, the sender path passes through intervening combinational logic. Note that the sender path does not pass through other clocked memory elements in the circuit.

Embodiments of the present invention can also identify one or more enable-generating memory elements. These enable-generating memory elements are clocked memory elements that generate a clock-enable signal for seed memory elements. Identifying an enable-generating memory element can involve identifying a path ("enable-signal path") from an output of the enable-generating memory element to a clock-enable signal for a seed memory element. This clock-enable signal can be used to gate the clock signal input to the seed memory element.

The enable-signal path can be identified by traversing the circuit upstream, e.g., from the clock signal input of a seed memory element to the output of an enable-generating memory element. In some embodiments of the present invention, the enable-signal path passes through intervening combinational logic. And, in some embodiments, the enable-signal path passes through other clocked memory elements in the circuit. In yet other embodiments, the enable-signal path does not pass through other clocked memory elements in the circuit.

During upstream clock-gating propagation, some embodiments of the present invention generate an enable signal which can be used to gate a clock signal to the sender memory element. This enable signal can be generated from one or more enable signals that gate clocks to seed memory elements.

More specifically, the enable signal for the sender memory element can be generated from data inputs for enable-generating memory elements. Generating the enable signal for the sender memory element can involve generating a time-shifted enable signal that corresponds to the enable signal for the seed memory element. This time-shifted enable signal can be generated in an earlier stage of the circuit pipeline, so that the time-shifted enable signal toggles one or more clock cycles ahead of the enable signal for the seed memory element. The time-shifted enable signal facilitates turning off the clock to the sender memory element before the clock signal to the seed memory element is turned off.

In some embodiments of the present invention, generating the time-shifted enable signal involves replicating some or all of the intervening combinational logic that is used to generate a clock-enable signal for a seed memory element. Note that the intervening combinational logic can be replicated in an earlier stage of the circuit pipeline, and can use signals for the earlier pipeline stage to generate the time-shifted enable signal. More specifically, the replicated combinational logic can use data inputs for the enable-generating memory elements to generate the time-shifted enable signal at a pipeline stage for the sender memory elements.

Also note that gating a clock signal can involve adding logic to the circuit to disable the clock signal. For example, some embodiments of the present invention can add a "clock header" to the circuit to facilitate clock-gating. This clock header receives the clock signal, and outputs a gated clock. To facilitate gating the clock signal, the clock header can also receive an enable signal. This enable signal can be used to enable the clock during normal operation, and to disable the clock when the clock can be gated. Clock headers generally output a gated clock signal that is synchronous with respect to the input clock for the clock header.

In some embodiments, clock-gating is not propagated to a sender memory element if an output of the sender memory element can be traced to a primary output of the circuit. And, in some embodiments, clock-gating is not propagated to the sender memory element if the output of the sender memory element can be traced to an input of a "free-running" (un-gated) memory element though a combinational logic cloud.

Merging Clock Domains

Some embodiments of the present invention combine one or more gated clock domains. More specifically, if one or more gated clock domains are found during upstream path traversal, a merged enable signal can be generated by functionally combining the enable signals for the clock signals in the clock domains. This merged enable signal can then be used to gate clock signal inputs to sender memory elements.

Generating the merged enable signal can involve performing a logical OR of enable signals for the gated clock domains. The merged enable signal is then asserted when at least one of the enable signals for the clock domains is asserted. Next, the sender memory elements can be clock-gated using the merged enable signal, so that the clock signal to the sender memory elements is turned on when at least one of the clock signals to the seed memory elements is turned on. In other words, the clock signal to the sender memory elements can be turned off when all the clock signals to the seed memory elements are turned off.

Figure 2:
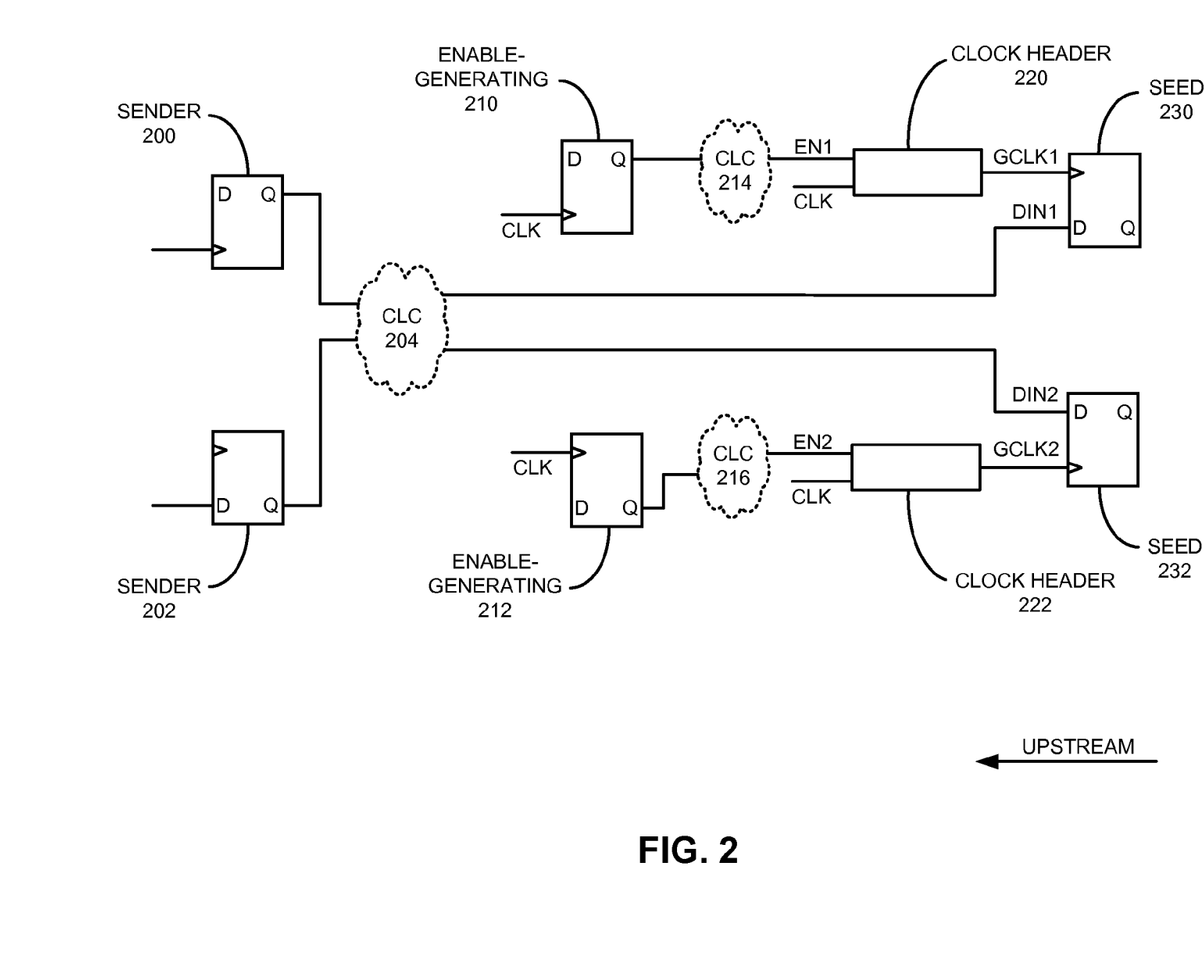
FIG. 2 presents a block diagram of a circuit that includes (upstream) sender memory elements, and (downstream) seed memory elements, in accordance with an embodiment of the present invention.

FIG. 2 presents a block diagram of a circuit that includes (upstream) sender memory elements, and (downstream) seed memory elements, in accordance with an embodiment of the present invention. In FIG. 2, data inputs for seed memory elements 230-232 receive signals from outputs of sender memory elements 200-202, through intervening combinational logic cloud 204. Note that sender memory elements 200-202 are not clock-gated, so that clock signals to sender memory elements 200-202 can continue to toggle while the clock signals to seed memory elements 230-232 are turned off.

Seed memory elements 230-232 receive gated clock signals ("gated clocks") GCLK1-GCLK2, respectively, where the gated clocks GCLK1-GCLK2 are generated using clock headers 220-222, respectively. Clock headers 220-222 receive clock-enable signals EN1-EN2, where the clock-enable signals EN1-EN2 are generated using outputs of enable-generating memory elements 210-212, respectively. Note that the circuit shown in FIG. 2 includes two gated clock domains, corresponding to gated clocks GCLK1 and GCLK2.

Intervening combinational logic cloud 204 generates data signals DIN1-DIN2, which are coupled to data inputs for seed memory elements 230-232, respectively. Combinational logic cloud 204 can generate data signals DIN1-DIN2 using the outputs of sender memory elements 200-202, respectively. For illustrative purposes, combinational logic cloud 204 is drawn using a dashed line to indicate that the combinational logic cloud 204 is optional. In other words, in some embodiments of the present invention, the output Q of either or both sender memory elements 200-202 can be connected directly to the data inputs for seed memory elements 230-232, respectively, without passing through intervening combinational logic.

With reference still to FIG. 2, embodiments of the present invention can identify a sender path from output Q of sender memory element 200 to the data input for seed memory element 230. Identifying the sender path can involve traversing the circuit upstream, e.g., from the data input for seed memory element 230, through combinational logic cloud 204, to the output of sender memory element 200. In other words, the sender path can pass through combinational logic cloud 204.

Embodiments of the present invention can also identify an enable-signal path from output Q of enable-generating memory element 210 to the clock signal input for seed memory element 230. This enable-generating path includes signals EN1 and GCLK1. Identifying the enable-generating path can involve traversing the circuit upstream, e.g., from the clock signal input for seed memory element 230, through clock header 220, through combinational logic cloud 214, to the output of enable-generating memory element 210.

Note that combinational logic cloud 214 is optional. In other words, in some embodiments of the present invention output Q of enable-generating memory element 210 can be connected directly to the enable signal input for clock header 220, without passing through intervening combinational logic.

Figure 3:
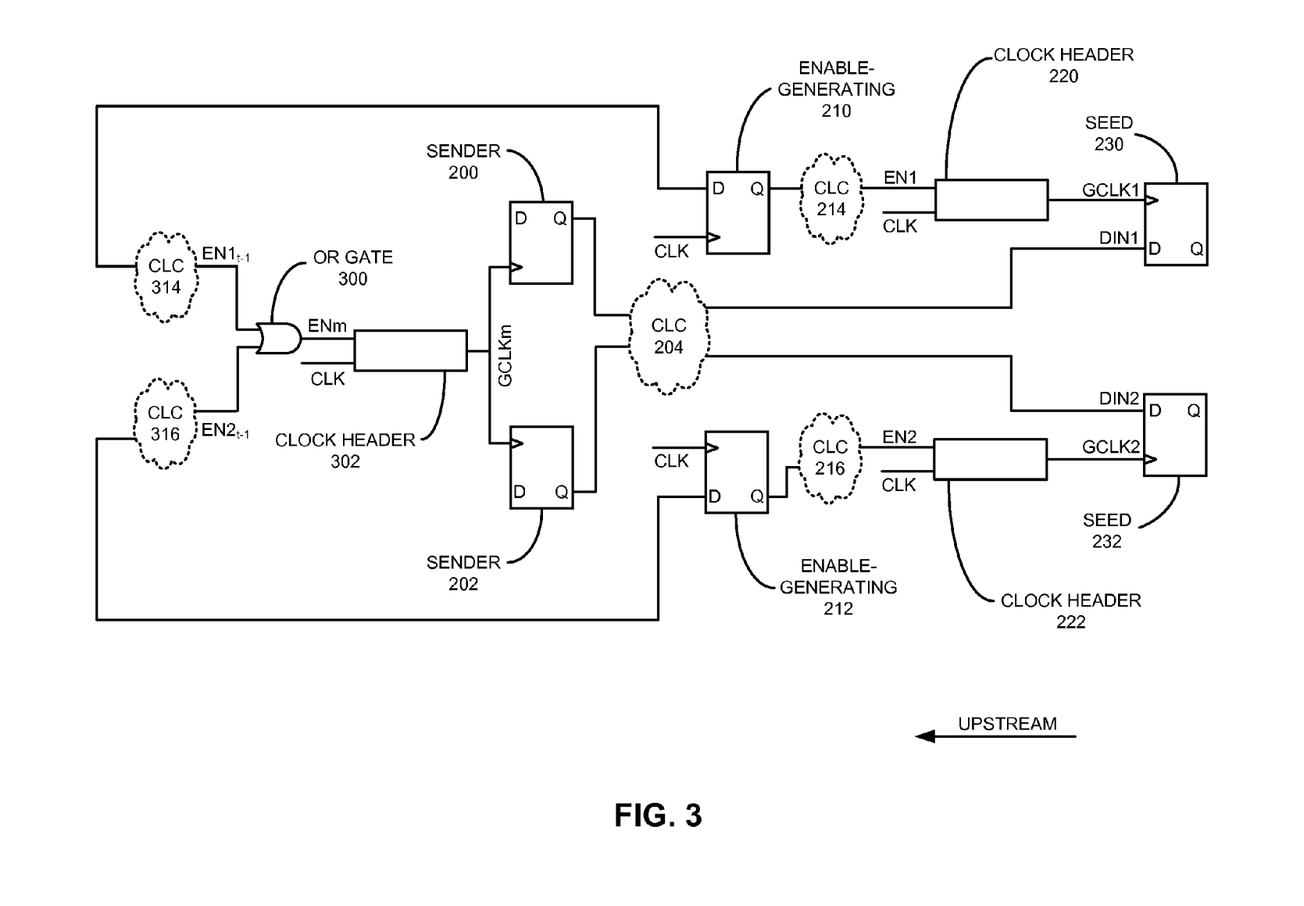
FIG. 3 presents a block diagram of a circuit with clock-gating propagated from (downstream) seed memory elements to (upstream) sender memory elements, in accordance with an embodiment of the present invention.

FIG. 3 presents a block diagram of a circuit with clock-gating propagated from (downstream) seed memory elements to (upstream) sender memory elements, in accordance with an embodiment of the present invention. More specifically, FIG. 3 shows the circuit shown in FIG. 2, with clock-gating propagated from seed memory elements 230-232 to sender memory elements 200-202.

Note that combinational logic clouds 314-316 are replicated from combinational logic clouds 214-216, respectively. More specifically, combinational logic clouds 314-316 include combinational logic clouds 214-216, respectively, wherein combinational logic clouds 214-216 are replicated one stage earlier in the circuit pipeline to become replicated logic clouds 314-316, respectively. Whereas combinational logic clouds 214-216 receive the outputs of enable-generating memory elements 210-212 as inputs, respectively, replicated logic clouds 314-316 receive the data inputs of enable-generating memory elements 210-212 as inputs, respectively. Hence, replicated logic clouds 314-316 can generate time-shifted enable signals $EN1_{t-1}$ and $EN2_{t-1}$, which correspond to EN1-EN2, respectively. Note that $EN1_{t-1}$-$EN2_{t-1}$ will toggle one clock cycle ahead of EN1-EN2, because the data inputs of enable-generating memory elements 210-212 appear at the outputs of enable-generating memory elements 210-212 after a clock cycle. In other words, EN1-EN2 are generated a clock cycle after $EN1_{t-1}$-$EN2_{t-1}$ are generated.

As was described earlier, the circuit of FIG. 2 includes two gated clock domains, corresponding to gated clocks GCLK1-GCLK2. Hence, with reference to FIG. 3, during upstream clock-gating propagation, embodiments of the present invention merge the gated clock domains by combining $EN1_{t-1}$-$EN2_{t-1}$. More specifically, the gated clock domains are merged using OR gate 300 to generate enable signal ENm, which is asserted when $EN1_{t-1}$ or $EN2_{t-1}$ is asserted. Consequently, gated clock GCLKm will be turned off only when both clocks GCLK1-GCLK2 are turned off.

Note that, for illustrative purposes, FIGS. 2-3 include two seed memory elements, two enable-generating memory elements, and two sender memory elements. Other embodiments can include fewer or more of any of these memory elements.

Also note that, as was described earlier, combinational logic clouds 214-216 are optional. If any of combinational logic clouds 214-216 is omitted, the respective combinational logic clouds 314-316 are not replicated. More specifically, using combinational logic cloud 214 as an example, in embodiments where there is no combinational logic cloud 214 in the enable-generating path for seed memory element 230, combinational logic cloud 314 is not replicated. In other words, if clock header 220 directly receives output Q of enable-generating memory element 210, then OR gate 300 directly receives the data input of enable-generating memory element 210 (without passing through intervening combinational logic). Note that combinational logic cloud 204 is not replicated, because combinational logic cloud 204 is not used to generate a gated clock for seed memory elements 230-232.

Also note that, for illustrative purposes, combinational logic clouds 214-216 each receive one input signal, i.e., the output of enable-generating memory elements 210-212, respectively. In other embodiments, combinational logic clouds 214-216 can each receive any number of signals to generate EN1-EN2, respectively. For example, combinational logic cloud 214 can receive three signals, each from an output of a separate enable-generating memory element. Then, in this example, replicated combinational logic cloud 314 will also receive three signals, each from a data input for the three enable-generating memory elements.

Method for Clock-Gating Propagation

Figure 4:
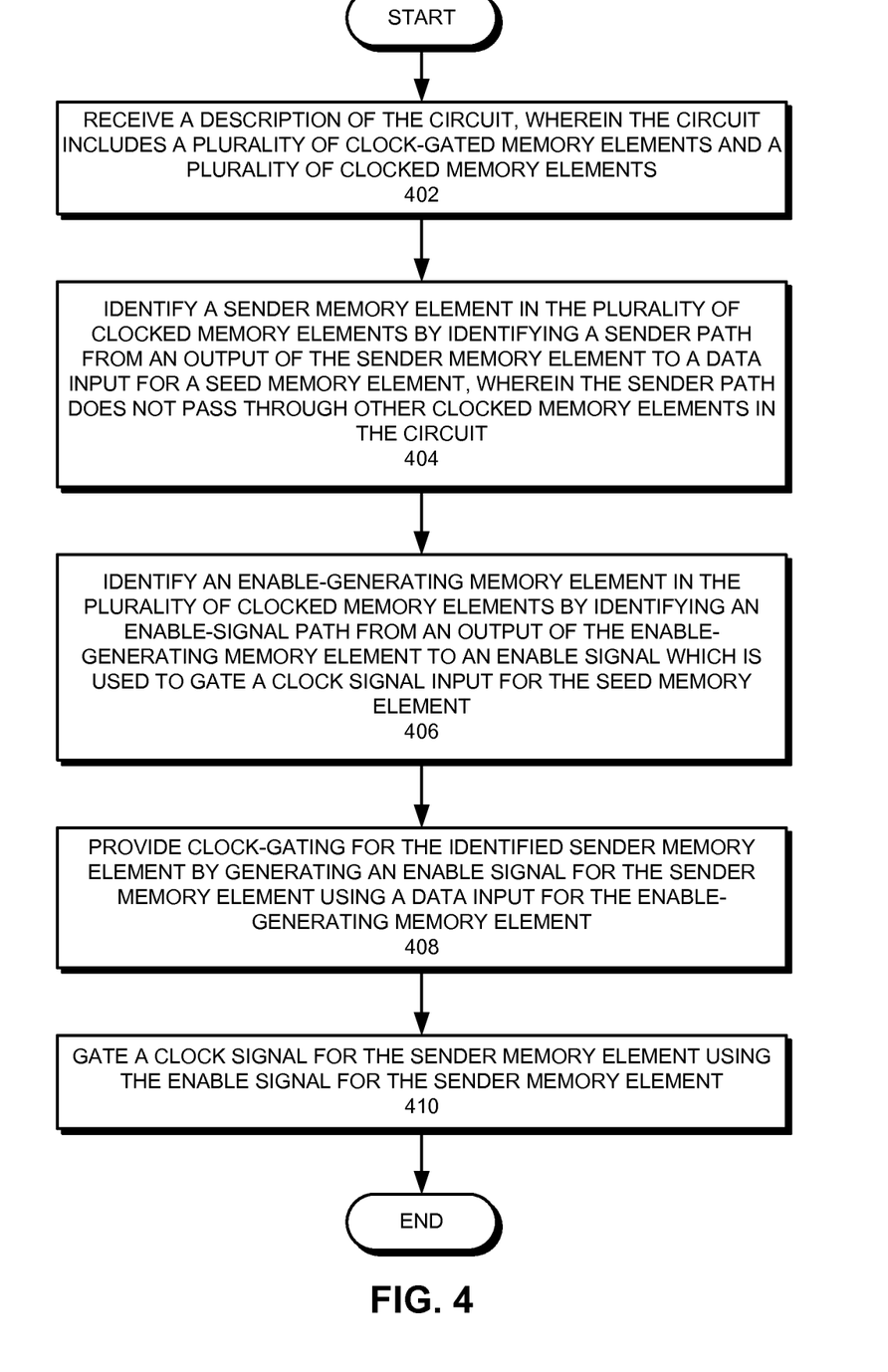
FIG. 4 presents a flow chart illustrating a process for providing clock-gating for a circuit, in accordance with embodiments of the present invention.

FIG. 4 presents a flow chart illustrating a process for providing clock-gating for a circuit in accordance with embodiments of the present invention. This circuit can include a plurality of clock-gated memory elements and a plurality of clocked memory elements.

The process begins with processor 102 receiving a description of the circuit (step 402). For example, processor 102 can receive an RTL, gate-level, and/or mixed representation of the circuit.

Next, processor 102 identifies a sender memory element in the plurality of clocked memory elements by identifying a sender path from an output of the sender memory element to a data input for a seed memory element (step 404). As was described earlier, the identified sender path does not pass through other clocked memory elements in the circuit.

Then, processor 102 identifies an enable-generating memory element in the plurality of clocked memory elements by identifying an enable-signal path from an output of the enable-generating memory element to an enable signal which is used to gate a clock signal input for the seed memory element (step 406).

Next, clock gating is provided for the identified sender memory element by generating an enable signal for the sender memory element using a data input for the enable-generating memory element (step 408). Then, the clock signal for the sender memory element is gated using the enable signal for the sender memory element (step 410).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing clock-gating for a circuit, comprising:
   using a processor to receive a description of the circuit, wherein the circuit includes a plurality of clock-gated memory elements and a plurality of clocked memory elements;
   identifying a sender memory element in the plurality of clocked memory elements by identifying a sender path from an output of the sender memory element to a data input for a seed memory element, wherein the sender path does not pass through other clocked memory elements in the circuit;
   identifying an enable-generating memory element in the plurality of clocked memory elements by identifying an enable-signal path from an output of the enable-generating memory element to an enable signal which is used to gate a clock signal input for the seed memory element;
   providing clock-gating for the identified sender memory element by generating an enable signal for the sender memory element using a data input for the enable-generating memory element; and
   gating a clock signal for the sender memory element using the enable signal for the sender memory element.

2. The method of claim 1, wherein generating the enable signal for the sender memory element involves generating an enable signal which is used to gate the clock signal input for the seed memory element in a pipeline stage for the circuit that is earlier than a pipeline stage for the seed memory element.

3. The method of claim 1, wherein the enable-generating path passes through intervening combinational logic in the circuit, and wherein generating the enable signal for the sender memory element involves replicating some or all of the intervening combinational logic in a pipeline stage for the circuit that is earlier than a pipeline stage for the seed memory element.

4. The method of claim 3, wherein the enable-generating path does not pass through other clocked memory elements in the circuit.

5. The method of claim 1, further comprising:
   identifying a second sender memory element in the plurality of clocked memory elements by identifying a second sender path from an output of the second sender memory element to a data input for a second seed memory element, wherein the second sender path does not pass through other clocked memory elements in the circuit;
   identifying a second enable-generating memory element in the plurality of clocked memory elements by identifying a second enable-signal path from an output of the second enable-generating memory element to an enable signal which is used to gate a clock signal input for the second seed memory element; and
   gating a clock signal for the second sender memory element using the enable signal for the sender memory element, wherein generating the enable signal for the sender memory element involves functionally combining the data input for the enable-generating memory element with a data input for the second enable-generating memory element.

6. The method of claim 5, wherein the enable signal for the sender memory element is asserted when at least one of the enable signal which is used to gate a clock signal input for the seed memory element and the enable signal which is used to gate the clock signal input for the second seed memory element is asserted.

7. The method of claim 5, wherein the seed memory element and the second seed memory element are downstream clock-gated memory elements.

8. The method of claim 1, wherein the description of the circuit includes at least one of:
   a Register Transfer Language (RTL) representation;
   a gate-level representation; and
   a mixed representation.

9. The method of claim 1, wherein the sender memory element comprises an upstream clocked memory element in the plurality of clocked memory elements, wherein the sender memory element is different from the seed memory element, and wherein the seed memory element comprises a clock-gated memory element in the plurality of clock-gated memory elements.

10. A non-transitory computer-readable storage medium storing instructions that when executed by a computer cause the computer to perform a method for providing clock-gating for a circuit, the method comprising:
    receiving a description of the circuit, wherein the circuit includes a plurality of clock-gated memory elements and a plurality of clocked memory elements;
    identifying a sender memory element in the plurality of clocked memory elements by identifying a sender path from an output of the sender memory element to a data input for a seed memory element, wherein the sender path does not pass through other clocked memory elements in the circuit;
    identifying an enable-generating memory element in the plurality of clocked memory elements by identifying an enable-signal path from an output of the enable-generating memory element to an enable signal which is used to gate a clock signal input for the seed memory element;
    providing clock-gating for the identified sender memory element by generating an enable signal for the sender memory element using a data input for the enable-generating memory element; and
    gating a clock signal for the sender memory element using the enable signal for the sender memory element.

11. The computer-readable storage medium of claim 10, wherein generating the enable signal for the sender memory element involves generating an enable signal which is used to gate the clock signal input for the seed memory element in a pipeline stage for the circuit that is earlier than a pipeline stage for the seed memory element.

12. The computer-readable storage medium of claim 10, wherein the enable-generating path passes through intervening combinational logic in the circuit, and wherein generating the enable signal for the sender memory element involves replicating some or all of the intervening combinational logic in a pipeline stage for the circuit that is earlier than a pipeline stage for the seed memory element.

13. The computer-readable storage medium of claim 10, the method further comprising:
   identifying a second sender memory element in the plurality of clocked memory elements by identifying a second sender path from an output of the second sender memory element to a data input for a second seed memory element, wherein the second sender path does not pass through other clocked memory elements in the circuit;
   identifying a second enable-generating memory element in the plurality of clocked memory elements by identifying a second enable-signal path from an output of the second enable-generating memory element to an enable signal which is used to gate a clock signal input for the second seed memory element; and
   gating a clock signal for the second sender memory element using the enable signal for the sender memory element, wherein generating the enable signal for the sender memory element involves functionally combining the data input for the enable-generating memory element with a data input for the second enable-generating memory element.

14. The computer-readable storage medium of claim 13, wherein the enable signal for the sender memory element is asserted when at least one of the enable signal which is used to gate a clock signal input for the seed memory element and the enable signal which is used to gate the clock signal input for the second seed memory element is asserted.

15. The computer-readable storage medium of claim 13, wherein the seed memory element and the second seed memory element are downstream clock-gated memory elements.

16. An apparatus configured to provide clock-gating for a circuit, the apparatus comprising:
   a receiving mechanism configured to receive a description of the circuit, wherein the circuit includes a plurality of clock-gated memory elements and a plurality of clocked memory elements;
   a sender-identification mechanism configured to identify a sender memory element in the plurality of clocked memory elements by identifying a sender path from an output of the sender memory element to a data input for a seed memory element, wherein the sender path does not pass through other clocked memory elements in the circuit;
   an enable-identification mechanism configured to identify an enable-generating memory element in the plurality of clocked memory elements by identifying an enable-signal path from an output of the enable-generating memory element to an enable signal which is used to gate a clock signal input for the seed memory element;
   an enable-generating mechanism configured to provide clock-gating for the identified sender memory element by generating an enable signal for the sender memory element using a data input for the enable-generating memory element; and
   a gating mechanism configured to gate a clock signal for the sender memory element using the enable signal for the sender memory element.

17. The apparatus of claim 16, wherein the enable-generating mechanism is configured to generate the enable signal for the sender memory element by generating an enable signal which is used to gate the clock signal input for the seed memory element in a pipeline stage for the circuit that is earlier than a pipeline stage for the seed memory element.

18. The apparatus of claim 17, wherein the enable-generating path passes through intervening combinational logic in the circuit, and wherein, while generating the enable signal for the sender memory element, the enable-generating mechanism is configured to replicate some or all of the intervening combinational logic in a pipeline stage for the circuit that is earlier than a pipeline stage for the seed memory element.

19. The apparatus of claim 16, wherein:
   the sender-identification mechanism is further configured to identify a second sender memory element in the plurality of clocked memory elements by identifying a second sender path from an output of the second sender memory element to a data input for a second seed memory element, wherein the second sender path does not pass through other clocked memory elements in the circuit;
   the enable-identification mechanism is further configured to identify a second enable-generating memory element in the plurality of clocked memory elements by identifying a second enable-signal path from an output of the second enable-generating memory element to an enable signal which is used to gate a clock signal input for the second seed memory element;
   the enable-generating mechanism is further configured to generate an enable signal for the sender memory element by functionally combining the data input for the enable-generating memory element with a data input for the second enable-generating memory element; and
   the gating mechanism is further configured to gate the clock signal for the second sender memory element using the enable signal for the sender memory element.

20. The apparatus of claim 19, wherein the enable signal for the sender memory element is asserted when at least one of the enable signal which is used to gate a clock signal input for the seed memory element and the enable signal which is used to gate the clock signal input for the second seed memory element is asserted.

* * * * *